United States Patent [19]

Caswell et al.

[11] 4,003,737
[45] Jan. 18, 1977

[54] METHOD OF AGGLOMERATING WITH ADDITIVES IN THE BRIDGING LIQUID

[75] Inventors: Bruce F. Caswell, Ann Arbor, Mich.; I. E. Puddington, Ottawa, Canada

[73] Assignee: Canadian Patents and Development Limited, Ottawa, Canada

[22] Filed: July 22, 1974

[21] Appl. No.: 490,285

Related U.S. Application Data

[63] Continuation of Ser. No. 295,295, Oct. 5, 1972, abandoned.

[52] U.S. Cl. .......................................... 75/3; 209/5; 210/59; 423/626; 423/631
[51] Int. Cl.[2] .......................................... C22B 1/08
[58] Field of Search ..... 23/313; 106/288 Q, 308 N, 106/309; 209/5; 210/49, 59; 260/314.5; 423/138, 395, 493, 558, 626, 631, 632; 75/3-5

[56] References Cited

UNITED STATES PATENTS

| | | | |
|---|---|---|---|
| 1,858,274 | 5/1932 | Kern et al. | 75/4 |
| 2,699,440 | 1/1955 | Eastes et al. | 106/308 N |
| 2,806,775 | 9/1957 | West et al. | 75/5 |
| 3,124,418 | 3/1964 | Malley et al. | 423/626 |
| 3,264,069 | 8/1966 | Getty | 23/313 |
| 3,268,071 | 8/1966 | Puddington et al. | 209/5 |
| 3,368,004 | 2/1968 | Siranni et al. | 23/313 |
| 3,471,267 | 10/1969 | Capes et al. | 23/313 |
| 3,480,389 | 11/1969 | Graulier | 423/626 |
| 3,749,590 | 7/1973 | Thomas | 106/288 Q |

*Primary Examiner*—Charles N. Hart
*Assistant Examiner*—Peter A. Hruskoci
*Attorney, Agent, or Firm*—Woodhams, Blanchard and Flynn

[57] ABSTRACT

Method of agglomerating solids in a liquid suspension utilizing in the bridging liquid an additive chemically active with respect to such solids. The solid to be agglomerated is suspended in a first liquid which is, or is made to be, at least relatively nonwetting with respect thereto. A second immiscible or bridging liquid is then introduced into said first liquid. Said second liquid is, or contains dissolved therein material which is, reactive to such solid material. The entire system is then agitated and the solid material thereby formed into agglomerates. The use of a chemically reactive material in the bridging liquid provides a wide range of selectability of and control over the properties, either physical or chemical, of the resulting agglomerates.

3 Claims, 2 Drawing Figures

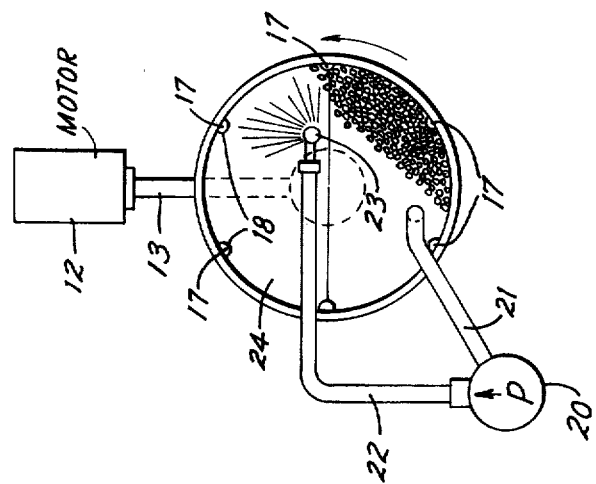
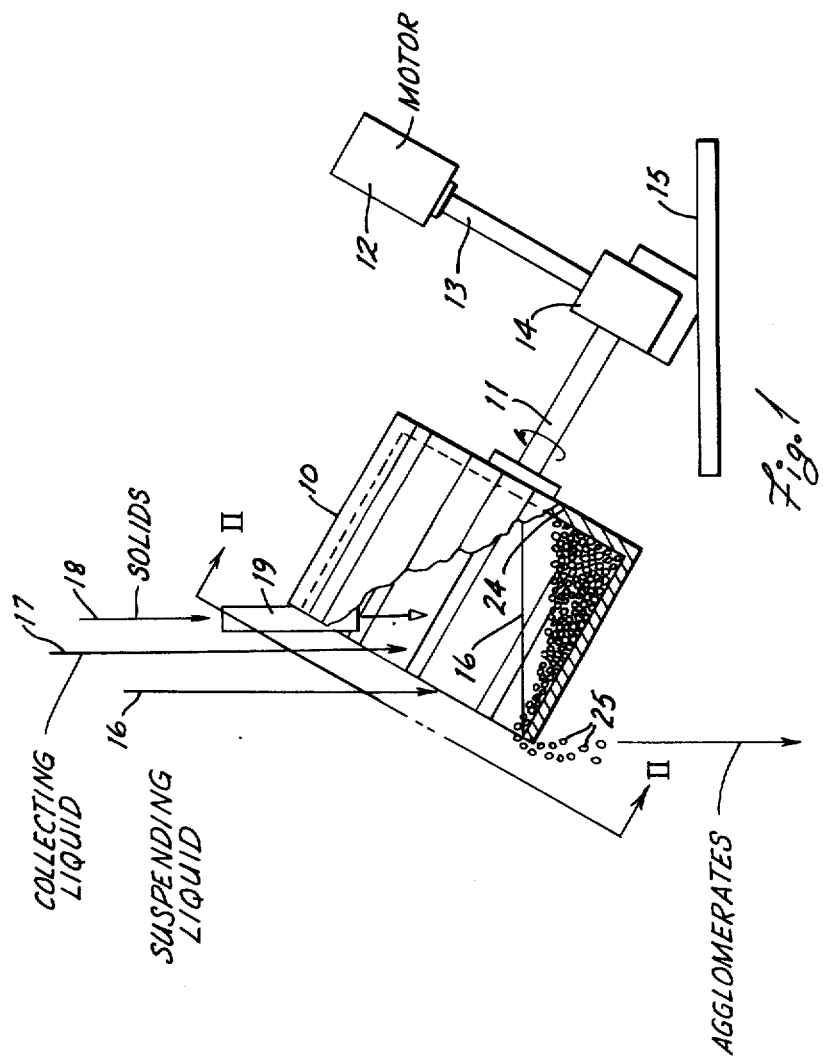

METHOD OF AGGLOMERATING WITH ADDITIVES IN THE BRIDGING LIQUID

This is a continuation of application Ser. No. 295,295, filed Oct. 5, 1972, now abandoned.

FIELD OF THE INVENTION

This invention relates to the formation of agglomerates of finely divided materials and particularly to such a process characterized by the use of a bridging liquid reactive with, or containing a material reactive with, said powder or at least a component thereof. Said process may be used either as a technique for separating said powders from a carrying liquid or because the said material is itself desired for use in an agglomerated, as pellet or ball, form.

BACKGROUND OF THE INVENTION

The broad process of forming an agglomerated product, as a pellet or a ball, from a suspension of solid material or materials in a finely divided form has long been known and certain specific processes utilizing the basic concept are set forth in a variety of United States and other patents. Examples of these patents are those to Puddington and Farnand U.S. Pat. No. 3,268,071, Sirianni and Puddington U.S. Pat. No. 3,368,004 and Capes et al U.S. Pat. No. 3,471,267. Briefly, all three of these patents refer to a procedure wherein the powders are suspended in a first liquid which is lyophobic to said powders, a second or bridging liquid is then added thereto which is chosen or treated so as to be lyophilic to at least certain of said powders and the system is then agitated. This forms the material which is lyophilic to the bridging liquid into a plurality of agglomerates whose size and shape depend on the details of said procedure as same are set forth at length in said patents and to which reference is invited. These procedures may be and are used both for the separation of one of a mixture of solids from such mixture and such is the main purpose of the above-mentioned Puddington U.S. Pat. No. 3,268,071, or they may be and are used where the formation of an agglomerated product is the objective itself of the agglomeration procedure and such is the principal purpose of the other two patents above-named.

The processes above-described are highly successful within certain limits which are reasonably well understood by those skilled in the art but workers in this field have been unable by following the processes of said patent to obtain the range of properties which are desirable to make such processes of broad industrial applicability. For example, in making balls by agglomeration processes it is often desirable to have said balls exhibit a substantial degree of hardness and/or strength, such as if said balls are to be used as bearing balls. This cannot be obtained according to the processes of the above-mentioned patents excepting by supplemental procedures such as adding binders or by sintering. However, while this provides hardness, these procedures often introduce other problems such as undesirably raising density, decreasing porosity or in the case of the addition of binders introducing essentially what is a contaminant. This latter can be undesirable where the agglomerates are to be used as catalytic pellets or solid fuel particles.

Thus it is desirable to provide a method employing generally the agglomerating techniques of the above-mentioned patents but wherein said techniques are modified and extended to make possible a wider range of control and/or selectability of the properties of the resulting product than is possible by presently known techniques.

Accordingly, the objects of the invention include the following:

1. To provide a process for agglomerating finely divided solid materials which will produce agglomerates of wider range and selectivity of properties than was formerly possible, such as hardness, mechanical strength, solubility, bulk density, surface area, chemical activity.

2. To provide a process, as aforesaid, which is an improvement over the procedures disclosed in the three above-mentioned patents.

3. To provide a process for agglomerating finely divided solid materials which while basically employing the hydrophobic-hydrophilic forces relied upon by the above-mentioned patents, additionally modifies the materials involved therein by one or more selectable chemical reactions whereby to supplement the effects of the hydrophobic-hydrophilic procedures and obtain thereby a much wider range of and better control over, the properties of the final product.

4. To provide a process for agglomerating finely divided solid materials which will be extendible to situations (referring primarily to materials and suspendant liquids) which do not respond at all to hydrophobic-hydrophilic processes.

5. To provide a process, as aforesaid, which, for many cases, will not add material expense over the procedures disclosed in any or all of the three above-mentioned patents.

6. To provide a process, as aforesaid, which can be carried out with relatively simple equipment, including equipment essentially similar to that set forth in the above-mentioned patent to Capes et al U.S. Pat. No. 3,471,267.

7. To provide a process, as aforesaid, which is applicable to a wide range of powdered materials and which can be carried out with a wide range of treating materials.

8. To provide a process, as aforesaid, whose details may be readily modified in a given case according to the particulars of the starting material used and the precise nature of the end products desired.

Other objects and purposes of the invention will be apparent to those skilled in the art upon reading the following disclosure and inspecting the accompanying drawings.

BRIEF DESCRIPTION OF THE DRAWINGS

In the drawings:

FIG. 1 is a side elevation partly in section of apparatus by which the process of the invention may be conveniently carried out.

FIG. 2 is a view taken on the line II—II of FIG. 1.

SUMMARY OF THE INVENTION

Briefly, the invention contemplates a process consisting essentially of the following steps.

1. Suspending the finely divided materials to be agglomerated in a fluid, usually liquid, medium which is, or is made, at least relatively non-wetting with respect thereto. Where the process is used for separating solid materials already suspended in a liquid, the starting material is, of course, such liquid with the solid material suspended therein and if necessary the first step is to treat the solid material to make same to some selected degree lyophobic with respect to such liquid.

2. A bridging liquid is then introduced into said suspending liquid. Said bridging liquid is, or contains dissolved material which is, reactive to such finely divided material, or to at least one of said finely divided materials if more than one is present, and the entire system then agitated.

3. After an appropriate period of agitation, the agglomerated particles are formed. The system may then be permitted to stand for a period of time, if necessary, during which time a strong bond may be permitted in appropriate cases to develop between the agglomerated particles of said material.

4. The agglomerated particles may then, if desired, be dried to drive off from the surface the liquid which was used as the initial suspending medium, as well as to drive off any remaining portions of the bridging liquid.

5. If desired, the agglomerated particles may then be calcined in the usual manner.

The novel portion of the above-outlined procedure is believed to be the use of a reactive material in or as the bridging liquid and, where needed, the standing period following the agitation to permit the chemical reaction to proceed.

DETAILED DESCRIPTION

Inasmuch as the present invention is an improvement over the processes disclosed in the three above-named patents, as well as other similar patents, and is recognized as applicable to a wide range of materials, suspendant liquids, bridging liquids, and other circumstances and conditions as set forth in said patents, the basic procedure as set forth in said patents will not be repeated here but reference will be made to these patents, and particularly to U.S. Pat. Nos. 3,368,004 and 3,471,267, for such disclosure. The present disclosure for purposes of brevity will be confined to exemplary material setting forth the present improvement. Thus, the following description will be understood merely as exemplary within the scope of the broader disclosure of said patents and reference hereinafter to specific materials, methods of treatment, times and temperatures will, unless the context specifically indicates otherwise, be understood as merely exemplary of the present invention and not as limiting.

Powdered Materials

The process is applicable to a wide range of powdered materials both as to material and size thereof as set forth in said U.S. Pat. No. 3,368,004. Thus, for present purposes and solely to illustrate the process, it will be sufficient to refer primarily to the process of the present invention as carried out with alumina ($Al_2O_3$) powder of a fineness within the approximate range of 10 – 250 microns, although reference will be made in the Examples to carrying out the process with other materials.

Size of Balls

The size of the balls or other pellets formed by the agglomeration process is dependent upon several factors as set forth in said U.S. Pat. No. 3,368,004 and needs no detailed recitation. Briefly, a wide range of sizes is available from the agglomeration process of the present invention and is dependent primarily upon the volume of the bridging liquid as compared to the surface area of the suspended solids. Increasing the volume of the second liquid usually results in larger sizes of balls at least to a limit where a pasty mass is obtained instead of balls. More violent shaking at higher temperatures usually lead to smaller size balls.

First Liquid

The choice of first liquid is same as in said above-mentioned U.S. Pat. No. 3,368,004. Briefly, a wide range of liquids are available but usually, the liquid is one which is or may be made lyophobic with respect to the powder. A common example where alumina is the solid material is a chlorinated aliphatic hydrocarbon, such as chloroform ($CHCl_3$), perchlorethylene ($C_2Cl_4$) or trichlorethane ($C_2H_3Cl_3$).

Bridging Liquid

Turning now to the nature of the bridging liquid, same consists of a solvent or suspendant liquid of the same general character as that set forth under the heading "Second Liquid" in said U.S. Pat. No. 3,368,004 with a reactive component added thereto which is chemically reactive with respect to at least one component of the above-mentioned finely divided solid material. The proportions likewise are generally the same for said bridging liquid with respect to solid material as set forth in said patent, and said proportions are chosen for a given case in accordance with the same criteria as previously known and set forth in said above-mentioned patents. However, in most instances, the use of such reactive material may alter the precise amount of bridging liquid used in the process of the invention as compared to a similar (where applicable at all) process of the prior art in which no such reactive material is used. In any case, however, as above stated, the criteria for choosing the amount of bridging liquid remain the same as previously known and hence need no further elaboration.

In a typical case with aluminum oxide the bridging liquid will consist of water as the base material and either or both of nitric acid and aluminum nitrate as the reactive material. In one highly advantageous application of the invention, both nitric acid and aluminum nitrate are used. In such case, the nitric acid concentration may vary from about 0.3% to about 10%, usually 1%–2%, by weight of the bridging liquid and the aluminum nitrate will vary from about 0.5% to about 20%, usually about 2%, by weight of the bridging liquid. The concentration of the nitric acid will be chosen primarily according to strength desired in a given final product subject however to an upper limit as set forth below. For example, with one typical sample of alumina agglomerated to form balls substantially as set forth above, varying the quantity of nitric acid used as reactive material, all other parameters remaining the same, resulted in the following changes in the product:

| Percentage of Nitric Acid by Weight | Properties of Product |
|---|---|
| 0 % | Forms balls of low strength, but good sphericity, same crushed easily. |
| 1/2 % | Forms balls of relatively good strength and of good sphericity. |
| 1 % | Greater strength, but sphericity slightly off. |
| 2 % | Extremely hard and sphericity further diminishes. |
| 3 % | Equal or even better strength than above but agglomerates are jagged and not round at all. |

-continued

| Percentage of Nitric Acid by Weight | Properties of Product |
|---|---|
| 5 % | Agglomeration process is inhibited. Alumina formed into agglomerates of gel-like material. |

Thus, increasing the nitric acid component used with alumina increases the strength and hardness of resulting agglomerates up to a limit as indicated above but it decreases the sphericity of the product and the speed of agglomeration. Thus, the exact amount of nitric acid utilized in this manner must be chosen, and it is an important result of the invention that it can be chosen, within the range and according to the principles set forth above to produce the particular product which in a given instance as desired.

As to the aluminum nitrate concentration, the following quantity of same is selected according to the following:

Porosity of End Product:
This decreases as the concentration of aluminum nitrate increases.

Hardness:
Increases as concentration increases up to a value where the product becomes undesirably brittle, in one case 20%.

It has been noted above that the nitric acid is merely a preferred example of a reagent used as above described with the bridging liquid. More broadly speaking, the reactive component thus added to the base bridging liquid may be any material which will with the original material to be agglomerated form a product which itself forms a bonding material between particles of the original material.

Further the reactive component will be chosen in view of the solid material being agglomerated so that the reaction therebetween will produce a reaction product as needed to produce finished agglomerates having the desired characteristics. Thus, the choice of, and quantities of, nitric acid and aluminum nitrate set forth above are selected to control strength, hardness and porosity of the end product and it will be apparent that other reactive components may be utilized in view of their reactivity with other initial finely divided solids to control these and other characteristics of the end products.

As to the aluminum nitrate, it should first be noted that the use of this material is optional in that in some instances, especially where the initial powder is very fine (minimum of voids) the aluminum nitrate may be omitted entirely. However, where used, the materials so added may instead of aluminum nitrate be any material which is compatible with the product of the reagent and the original powder i.e., not creating further reaction therewith), dispersable in the bridging liquid, physically strong to function as a binder, if desired, reasonably adherent to the original powder and in addition does not exceed acceptable levels of contamination for whatever use is intended for the end product or can be calcined or otherwise treated so that it will not exceed such acceptable levels of contamination.

Dispersing Second Liquid and Powder

It is evident that the two liquids must be dispersed evenly throughout each other and that the powder must be dispersed evenly throughout these intermixed liquids. Accordingly, any presently known method or means by which such dispersing is effectively carried out will be acceptable, such as the method of dispersing the second liquid and powder appearing in said U.S. Pat. No. 3,368,004 to which reference is made for a discussion of the details thereof.

Equipment

The equipment by which said dispersing is carried out may be anything which is effective for the purpose but the equipment illustrated in the accompanying drawings has been found to be particularly satisfactory. This equipment is illustrated and described in the patent of Capes U.S. Pat. No. 3,471,267 and hence does not need to be described in detail here. It is sufficient to state here that the drum 10 is an open drum mounted for rotation about its axis on a suitable shaft 11 driven by a motor 12 through a shaft 13 and gearbox 14. The drum axis is aligned at a desired angle and the drum faces upwardly sufficiently to facilitate the introduction of the material thereinto. Same may be arranged to discharge continuously as in said U.S. Pat. No. 3,471,267 or may be operated in a batch manner.

Procedure

Where operated continuously, additional first liquid, bridging liquid and fine divided material will be added as indicated by the arrows 16, 17 and 18 and further described in said U.S. Pat. No. 3,471,267. To operate in a batch manner, the chemically reactive bridging liquid will be added, as through the conduit 19, into a suitable container into which has already been placed the initial suspendant liquid with the solid material dispersed therein.

The material in the container is then agitated but the agitation action is not as limited in its direction, pattern, frequency and duration as set forth in the above-mentioned patents. Instead, it may be of any nature which produces a large number of collisions between the particles. For example, satisfactory agitation can be achieved by reciprocal shakers (as paint shakers), a rotating drum as shwon in the drawing, pump loops, propeller-type stirred tank or in-line mixers. The specific apparatus to be used in a given case will be largely chosen according to known material handling principles appropriately to the material being processed and the conditions of operation. However, shakers are presently preferred where spheres of good roundness and strength are desired. It may be stated briefly that increasing the severity or time of shaking will usually increase the density of the resulting balls, at least toward the theoretical limit, but may also decrease the size. Prolonging the shaking generally results in improved sphericity but too severe shaking may result in rough or abraded ball surfaces.

After the agitation step is completed, the agglomerates, if necessary, as in the case of aluminum oxide, are permitted to soak in the liquid for a period of time. During this time the bond between the particles develops and increases in strength. It appears necessary, however, in some cases as for aluminum oxide, to prevent the mass from drying out and hence the continuous phase liquid is maintained covering the mass. However, since the sole function here is to prevent the agglomerates from drying out before the above-mentioned bond has developed, any other way to maintain same in satisfactory condition without dilution of the active ingredients will be acceptable, such as by maintaining same in an atmosphere saturated with the discontinuous phase liquid.

An elevated temperature will usually accelerate the reaction. At normal room temperatures, however, the strength of the agglomerates increases rapidly for the first one to five days of such soaking and then tends to level off.

After completion of the soaking, the agglomerates may be separated from the continuous phase liquid in any conveniently available manner such as by decanting, filtering or screening. If the size distribution of the mass of agglomerates is wide, a sizing or screening step may be desirable.

The agglomerates will then be dried by any procedure capable of driving off the continuous phase liquid. The rate of drying however should be controlled according to conventional methodology at a sufficiently slow rate as to prevent cracking of the agglomerates or the bond between the particles thereof. While the precise mechanics within the agglomerates is not known, it appears that during the drying procedure the nitrates (referred to here in view of the specific exemplary materials above set forth) are concentrated between the particles, are recrystallized and attach themselves to the particles to form a strong bond therebetween. This appears to make possible a high level of strength even with agglomerates of relatively coarse particle sizes in spite of a lack of fine particles which might otherwise assist in strengthening the formed agglomerates.

As a final step, the agglomerates may, if desired, then be calcined in any conventional manner to drive off nitrogen compounds, especially $N_2O_5$, which leaves the alumina oxides as both the material of the original powder and as binders between the particles thereof.

EXAMPLES

Example 1

Finely divided activated and dried alumina ($Al_2O_3$) powder of approximately −325 mesh was suspended in a quantity of chloroform. Water was chosen as a bridging liquid to which was added nitric acid in sufficient quantity to provide a 2 percent by weight aqueous solution of the nitric acid. Aluminum nitrate in commercially available crystalline form [$Al(NO_3)_3 9H_2O$] was also added to the bridging liquid to provide a 4 percent by weight solution thereof. The bridging liquid so treated was then added to and mixed with the initial liquid with the alumina powders suspended therein and the entire mass agitated in a tumbler of the type shown in the drawing. Said tumbler was 12 inches in diameter and was rotated at 120 rpm for 6 hours. The rotation was then stopped and the entire mass permitted to stand at room temperature for 5 days. The continuous phase was then decanted from the agglomerates and the agglomerates heated sufficiently with mild agitation to dry same at a sufficiently slow rate to prevent cracking.

Example 2

The process set forth in Example 1 was repeated with the concentration of nitric acid reduced to 0.3 percent by weight of the bridging liquid. The hardness and strength of the resulting agglomerates was not quite as high as in Example 1 but same were both still satisfactory and substantially greater than in similar processes where nitric acid was not used

Example 3

The process in Example 1 was repeated with the concentration of nitric acid at 0.1 percent by weight of the bridging liquid and the aluminum nitrate eliminated. The strength and hardness of the resulting agglomerates, while greater than when no nitric acid was used, was unsatisfactorily low for the purpose intended in this instance, namely as a catalyst support.

Example 4

The process of Example 1 was repeated with a concentration of nitric acid of 5 percent by weight of the bridging liquid. The aluminum oxide did not agglomerate properly but instead formed small irregular gels which would not grow further and would not adhere to each other.

Example 5

The process of Example 1 was repeated with the concentration of aluminum nitrate at 0.5 percent by weight of the bridging liquid. The hardness and strength of the resulting agglomerates were satisfactory although not quite as great as when the slightly higher concentration of aluminum nitrate was used.

Example 6

The process of Example 1 was repeated with aluminum nitrate concentration of 10 percent by weight of the bridging liquid. The strength and hardness of the resulting agglomerates was satisfactory.

Example 7

The process of Example 1 was repeated with the concentration of aluminum nitrate in excess of 20 percent by weight of the bridging liquid. The resulting agglomerates were unsatisfactory because they were excessively brittle.

Example 8

The process of Example 1 was repeated and the resulting agglomerates calcined at 1000° F. for 3 hours. Same was then tested for hardness and found to have a substantially higher level of hardness than similar balls made by any of the processes of the above-named patents. Further examination of said agglomerates showed that the aluminum nitrate became aluminum oxide ($Al_2O_3$) and thereby eliminated aluminum nitrate as a contaminating material. The resulting agglomerates were further examined and found to have both an excellent high temperature resistance and a high resistance to water. Said agglomerates were soaked in water for 30 days and showed no signs of disintegration. However, without such calcining, the product of Example 1 has been observed to disintegrate into powder after soaking for 2 hours in water.

Example 9

A quantity of p-triphenylrosaniline sulfonic acid was dispersed in water in sufficient quantity to make an 8 percent by weight concentration. This was a very fine solid dispersion of an ink pigment wherein the desire was merely to remove the solid from the water. A bridging liquid consisting of an aliphatic hydrocarbon solvent with a 140° F. flash point (TCC) containing octylamine ($C_8H_{17}NH_2$) in sufficient quantity to make a 10 percent by weight solution in said bridging liquid was added to the above-mentioned dispersion and agitated for 10 minutes in a paint shaker. Agglomerates resulted which separated by gravity readily from the water suspendant. The agglomerates resulting were approximately 1/32 inch diameter and had virtually no strength. Hence they were readily adaptable to the subsequent process desired which, in this case, was to redivide same for use as ink or paint pigment. The observed tendency to agglomerate was believed to be due to the chemical reaction between the amine and the sulfonic acid group on the p-tripheyl-rosaniline sulfonic acid, forming the ammonium sulfonate, namely:

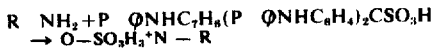
$$R\ NH_2 + P\ \varnothing NHC_7H_8(P\ \varnothing NHC_6H_4)_2CSO_3H \rightarrow O-SO_3H_3^+N - R$$

Example 10

The procedure of Example 9 was repeated excepting that the bridging liquid contained octadecylamine ($C_{18}H_{37}NH_2$) in place of the octylamine referred to above. The quantity of the amine was again sufficient to produce a 10 percent by weight solution in the bridging liquid. The mixture was again shaken for 10 minutes in a paint shaker. This produced agglomerates which likewise separated readily by gravity from the initial suspendant liquid, namely the water, but in this case the agglomerates were relatively strong and hard and would not redivide sufficiently easily to make them conveniently usable by subsequent processing as an ink or paint pigment.

Example 11

The procedure of Example 9 was repeated with the amine omitted. No agglomeration resulted.

Example 12

The procedure of Example 9 was repeated with the amine omitted and with each of the following successively used as the bridging liquid in place of the hydrocarbon solvent of Example 9: xylene, kerosene, trichlorethane and castor oil. In each case, no agglomeration resulted.

Example 13

Iron powder for the production of shot is dispersed in petroleum solvent, 0.20 c.c. of a 2 percent aqueous solution of ferric chloride per gram of iron powder is added and the system agitated. Spheres of about 2 m.m. diameter are formed that develop good green strength on standing. The strength is apparently owing to the chemical reaction $Fe + FeCl_3 \rightarrow FeCl_2$ at the surface of and bridging the iron particles.

Example 14

To tin oxide ($SnO_2$) dispersed in water, oleic acid or tall oil is added in a volume about equivalent to the volume of the oxide. On shaking, the oxide agglomerates into spheres of good green strength owing to the chemical adsorption (incipient reaction) on the surface of the solid and the wetting of the coated solid by the remainder of the tall oil or oleic acid phase.

Example 15

Four hundred grams of quick lime CaO particles dispersed in eight hundred grams of Varsol gives, on agitation with water bridging liquid, strong spheres owing to the binding action of the chemical reaction $CaO + H_2O \rightarrow Ca(OH)_2$.

Example 16

Twenty grams of iron mine tailings composed in part of metallic oxides and sulfides gave strong pellets when dispersed in Varsol and agglomerated by agitation with 5 grams of $H_2SO_4$ in 15 grams of water. The observed strength was believed to be due to the formation of iron sulfate bridges.

Example 17

Forty grams of iron mine tailings composed in part of metallic oxides and sulfides dispersed in 200 grams of Varsol gave very strong agglomerates when agitated with 4 grams of 85 percent phosphoric acid. The observed strength was believed to be due to the formation of iron phosphate bridges.

Example 18

Five grams of finely ground silica dispersed in Varsol formed strong spheres when agitated with 1.2 grams of water. The bonds are owing to surface hydration. $SiO_2 + H_2O \rightarrow H_2SiO_3$.

The embodiments of the invention in which an exclusive property or privilege is claimed are defined as follows:

1. A process for forming agglomerates of aluminum oxide from finely divided aluminum oxide particles in a two-phase liquid system, comprising:
   a. forming a suspension of aluminum oxide particles having a particle size in the range of from 10 to 250 microns, in a first liquid which is lyophobic with respect to aluminum oxide particles;
   b. adding to said suspension a second liquid consisting essentially of an aqueous nitric acid solution containing from 0.3 to 10 percent by weight of nitric acid and from 0.5 to 20 percent by weight of aluminum nitrate, said second liquid being lyophilic with respect to said aluminum oxide particles and being immiscible with said first liquid whereby to form a two-phase liquid system containing said particles in suspension;
   c. agitating the two-phase liquid system to effect repeated collisions of said aluminum oxide particles and thereby forming in said system a dispersion of agglomerates of said aluminum oxide particles and said second liquid, and during said agitating, simultaneously initiating a chemical reaction between said nitric acid and aluminum oxide on the surfaces of said aluminum oxide particles to form aluminum nitrate;
   d. discontinuing said agitating, maintaining said agglomerates immersed in the liquid phase and permitting said chemical reaction to proceed for a period of time effective to form aluminum nitrate on the surfaces of the aluminum oxide particles in the agglomerates, and then separating the agglomerates from the liquid phase;
   e. drying said agglomerates to drive off water and to crystallize said aluminum nitrate which bonds together the aluminum oxide particles in the agglomerates, the drying step being carried out at a rate effective to prevent cracking of the agglomerates; and
   f. calcining the dried agglomerates to transform said aluminum nitrate to aluminum oxide, whereby to obtain agglomerates of aluminum oxide particles bonded together by aluminum oxide binder.

2. A process according to claim 1, in which said second liquid contains a maximum of about 2 percent by weight of nitric acid.

3. A process for forming agglomerates of aluminum oxide from finely divided aluminum oxide particles in a two-phase liquid system, comprising:
  a. forming a suspension of aluminum oxide particles having a particle size in the range of from 10 to 250 microns, in a first liquid which is lyophobic with respect to aluminum oxide particles;
  b. adding to said suspension a second liquid consisting essentially of an aqueous nitric acid solution containing from 0.5 to 2 percent by weight of nitric acid and containing up to 20 percent by weight of aluminum nitrate, said second liquid being lyophilic with respect to said aluminum oxide particles and being immiscible with said first liquid whereby to form a two-phase liquid system containing said particles in suspension;
  c. agitating the two-phase liquid system to effect repeated collisions of said aluminum oxide particles and thereby forming in said system a dispersion of agglomerates of said aluminum oxide particles and said second liquid, and during said agitating, simultaneously initiating a chemical reaction between said nitric acid and aluminum oxide on the surfaces of said aluminum oxide particles to form aluminum nitrate;
  d. discontinuing said agitating, maintaining said agglomerates in contact with the liquid phase under conditions effective to prevent drying out of the agglomerates and permitting said chemical reaction to proceed for a period of time effective to form aluminum nitrate on the surfaces of the aluminum oxide particles in the agglomerates and then separating the agglomerates from the liquid phase;
  e. drying said agglomerates to drive off water and to crystallize said aluminum nitrate which bonds together the aluminum oxide particles in the agglomerates, the drying step being carried out at a rate effective to prevent cracking of the agglomerates; and
  f. calcining the dried agglomerates to transform said aluminum nitrate to aluminum oxide, whereby to obtain agglomerates of aluminum oxide particles bonded together by aluminum oxide binder.

* * * * *